United States Patent
Haas et al.

(10) Patent No.: US 10,032,564 B2
(45) Date of Patent: Jul. 24, 2018

(54) METHOD FOR THE PRODUCTION OF VALVE METAL POWDERS

(75) Inventors: Helmut Haas, Schladen-Beuchte (DE); Ulrich Bartmann, Goslar (DE); Christoph Schnitter, Holle (DE); Elisabeth Droste, Goslar (DE)

(73) Assignee: H.C. Starck Tantalum and Niobium GmbH (DE)

( * ) Notice: Subject to any disclaimer, the term of this patent is extended or adjusted under 35 U.S.C. 154(b) by 959 days.

(21) Appl. No.: 11/576,725

(22) PCT Filed: Sep. 24, 2005

(86) PCT No.: PCT/EP2005/010362
§ 371 (c)(1),
(2), (4) Date: Aug. 20, 2008

(87) PCT Pub. No.: WO2006/039999
PCT Pub. Date: Apr. 20, 2006

(65) Prior Publication Data
US 2009/0214378 A1    Aug. 27, 2009

(30) Foreign Application Priority Data
Oct. 8, 2004    (DE) .................. 10 2004 049 039

(51) Int. Cl.
| | | |
|---|---|---|
| C22C 27/02 | (2006.01) | |
| B22F 9/20 | (2006.01) | |
| H01G 9/052 | (2006.01) | |
| B22F 9/22 | (2006.01) | |
| C22B 4/08 | (2006.01) | |
| C22B 5/10 | (2006.01) | |
| C22B 5/14 | (2006.01) | |
| C22B 5/18 | (2006.01) | |
| C22B 34/12 | (2006.01) | |

(52) U.S. Cl.
CPC ............ *H01G 9/0525* (2013.01); *B22F 9/22* (2013.01); *C22B 4/08* (2013.01); *C22B 5/10* (2013.01); *C22B 5/14* (2013.01); *C22B 5/18* (2013.01); *C22B 34/1209* (2013.01); *B22F 2998/10* (2013.01)

(58) Field of Classification Search
CPC ........ B22F 2998/10; B22F 9/22; C22C 1/045; C22B 34/1209; C22B 4/08; C22B 5/10; C22B 5/14; C22B 5/18; H01G 9/0525
USPC .................................. 75/343, 255; 420/427
See application file for complete search history.

(56) References Cited

U.S. PATENT DOCUMENTS

| 4,722,756 A | 2/1988 | Hard |
|---|---|---|
| 6,051,326 A | 4/2000 | Fife |

(Continued)

FOREIGN PATENT DOCUMENTS

| JP | 2000-226602 A | 8/2000 |
|---|---|---|
| JP | 2002-206105 A | 7/2002 |

(Continued)

OTHER PUBLICATIONS

Kazakhstan Office Action dated Mar. 18, 2010.

*Primary Examiner* — Shuangyi Abu Ali
(74) *Attorney, Agent, or Firm* — Drinker Biddle & Reath LLP (57) ABSTRACT

The present invention relates to a process for the deoxidation of valve metal primary powders by means of reducing metals and/or metal hydrides, and a process for the production of tantalum powders that are suitable as anode material for electrolytic capacitors.

18 Claims, 4 Drawing Sheets

(56) References Cited

U.S. PATENT DOCUMENTS 6,558,447 B1   5/2003   Shekhter et al.
2002/0050185 A1   5/2002   Oda

FOREIGN PATENT DOCUMENTS

METHOD FOR THE PRODUCTION OF VALVE METAL POWDERS

RELATED APPLICATIONS

This application is a national stage application (under 35 U.S.C. 371) of PCT/EP2005/010362 filed Sep. 24, 2005, which claims the benefit of German application 10 2004 049 039.2 filed Oct. 8, 2004.

The present invention relates to a process for the production of valve metal powders having a high specific surface from the corresponding primary powders by means of reducing metals and/or metal hydrides, and relates in particular to a process for the production of tantalum powders that are suitable as anode material for electrolytic capacitors of high specific capacity.

Suitable as reducing metals are magnesium, calcium, barium and/or lanthanum and/or their hydrides, in particular magnesium.

According to the invention finely particulate powders of titanium, zirconium, hafnium, vanadium, niobium, tantalum, molybdenum and/or tungsten, preferably of niobium and/or tantalum, in particular tantalum powders, are used as primary powders.

The invention is described hereinafter in particular with reference to the production of tantalum powders for the production of capacitors.

As solid electrolytic capacitors having a very large active capacitor surface and therefore of compact structure suitable for mobile communications electronics, there are largely used capacitors with a niobium pentoxide or tantalum pentoxide barrier layer applied to a corresponding conductive carrier, by utilising their stability ("valve metal"), the comparatively high dielectric constant and the insulating pentoxide layer that can be produced having a very uniform layer thickness by an electrochemical method. Metallic precursors of the corresponding pentoxides are used as carriers. The carrier, which at the same time forms one of the capacitor electrodes (anode), consists of a highly porous, sponge-like structure that is produced by sintering very finely particulate primary structures, or already sponge-like secondary structures. The surface of the carrier structure is oxidised ("formed") electrolytically to the pentoxide, the thickness of the pentoxide layer being determined by the maximum voltage of the electrolytic oxidation ("forming voltage"). The counterelectrode is produced by impregnating the sponge-like structure with manganese nitrate, which is thermally converted to manganese dioxide, or with a liquid precursor of a polymer electrolyte followed by polymerisation; the conducting polymers that are thereby obtained are generally polypyrroles, polyanilines or polythiophenes. The electrical contacts with the electrodes are formed on one side by a tantalum or niobium wire that is sintered in during the production of the carrier structure, and the metallic capacitor sheathing insulated against the wire.

The capacitor C of a capacitor is calculated according to the following formula:

$$C = (F \cdot \in)/(d \cdot V_F)$$

where F is the capacitor surface, $\in$ is the dielectric constant, d is the thickness of the insulating layer per V forming voltage and $V_F$ is the forming voltage. The dielectric constant $\in$ for tantalum pentoxide is 27, and the thickness growth of the layer d per volt forming voltage is about 18 Å/V. On account of the different densities of metal and pentoxide, the pentoxide layer grows during the forming in a proportion of about ⅓ into the original metal structure and ⅔ onto the metal structure. Due to the growing pentoxide layer the pores become smaller until they become blocked or closed pores are formed, in which a cathode can no longer be formed. As a result there is a loss of active capacitor surface. The loss is greater the greater the forming voltage, i.e. the thickness of the pentoxide layer. Ideally the smallest pores of the anode structure and their access cross-sections are larger by a multiple of the thickness of the pentoxide layer that forms with the selected forming voltage.

Finely particulate tantalum primary powders with specific surfaces of 4 to 20 m²/g are obtained by reducing potassium heptafluorotantalate by means of an alkali metal in alkali chloride melts or, more recently, are obtained from finely particulate oxides by means of gaseous reducing metals or metal hydrides, in particular magnesium, or by mechanical comminution from tantalum blocks obtained by means of electron beams in vacuo or oxides reduced under hydrogen, after embrittlement by hydrogen saturation ("chips").

Such primary powders as a rule still exhibit a number of disadvantages on account of which they are still not suitable, according to present day standards, for the production of capacitors. They therefore usually undergo a reducing treatment at temperatures below 1000° C. ("deoxidation"), optionally after a high-temperature treatment in order to stabilise primary and secondary structures. In this connection the primary powders are mixed in one or more stages with hyperstoichiometric amounts, referred to the residual oxygen content, of finely particulate magnesium and are heated under a protective gas for several hours at the deoxidation temperature of 700° to 1000° C. During the deoxidation residual oxygen is removed, the primary particle structure becomes uniform, and the secondary particle structure is favourably influenced, in particular with respect to the pore structure and stability. A coarsening of the primary grains and reduction of the specific surface are associated with the deoxidation, which is all the more pronounced the larger the specific surface of the primary powder. It is therefore virtually impossible to produce tantalum powders with specific surfaces above 3 m²/g that are suitable for capacitor production. The reason for this is that the powder comes into contact with liquid magnesium during the deoxidation and therefore the rate of deoxidation and the local temperature during the deoxidation cannot be controlled. Obviously localised overheating and localised significant sintering with loss of porosity occurs on account of the heat released during the deoxidation.

Due to sintering of the anode pressed articles and forming there is furthermore a loss of active capacitor surface, so that even at the minimum necessary sintering temperature of 1200° C. capacitors with specific capacities of at most 150,000 μFV/g can be produced at a forming voltage of 16V from a powder with a specific surface of 3 m²/g, corresponding to an active capacitor surface of 1 m²/g.

It has now been found that the primary structure coarsening during the deoxidation can be greatly reduced if the contact of the metal powder with the liquid magnesium is avoided and the vapour pressure of the reducing metal is controlled. In particular it has been found that the specific surface (measured according to ASTM D 3663, Brunauer, Emmet and Teller "BET") during the deoxidation is reduced by less than a factor of 2. In addition the contamination due to non-evaporating residual impurities of the reducing metal is avoided.

Moreover, the pore structure is obviously favourably influenced, so that the loss of capacitor surface due to forming remains low and as a result capacitors with extremely high specific capacity can be produced.

The present invention provides tantalum powders with a specific surface of 4 to 8 m²/g, which after pressing at a pressing density of 5 g/cm³ and sintering at 1210° C. over 10 minutes have after forming up to a forming voltage of 10V a specific capacity of 220,000 to 350,000 µFV/g.

The invention also provides tantalum powders with a specific surface of 3.5 to 6 m²/g, which after pressing at a pressing density of 5 g/cm³ and sintering at 1210° C. over 10 minutes have after forming up to a forming voltage of 10V a specific capacity of 180,000 to 250,000 µFV/g.

The invention furthermore provides tantalum powders with a specific surface of 3.5 to 6 m²/g, which after pressing at a pressing density of 5 g/cm³ and sintering at 1210° C. over 10 minutes have after forming up to a forming voltage of 10V a capacity of 200,000 to 300,000 µFV/g, and after forming up to a forming voltage of 16V a capacity of 180,000 to 250,000 µFV/g. In this connection the in each case lower specific capacities are obtained with the powder of lower specific surface, and the in each case highest capacities are obtained with the powder with the highest specific surface. Intermediate values are obtained in each case with intermediate values of the specific surface. If higher sintering temperatures, for example up to 1250° C., are used, then on account of the greater degree of sintering slightly lower specific capacities are obtained.

The present invention also provides a process for the deoxidation of valve metal powders by means of reducing metals and/or metal hydrides, which is characterised in that the deoxidation is carried out without contact between the metal powder to be deoxidised and the liquid reducing metal/metal hydride.

Preferably the deoxidation is carried out at a partial vapour pressure of the reducing metal/metal hydride of 5 to 110 hPa.

The partial vapour pressure of the reducing metal is furthermore preferably less than 100 hPa, and particularly preferably is between 30 and 80 hPa.

According to the invention the metal powder and the reducing metal/metal hydride are placed at separate points in a reactor so that the reducing metal/metal hydride comes into contact with the metal powder only via the gaseous phase. The partial vapour pressure of the reducing metal/metal hydride is controlled by its temperature.

The temperature of the metal powder ("deoxidation temperature") should preferably be maintained between 680° and 880° C., particularly preferably between 690° and 800° C., and more particularly preferably below 760° C. At lower temperatures of the metal powder the time required for an effective deoxidation is unnecessarily increased. If the preferred temperature of the metal powder is exceeded to too great an extent, there is the danger of an excessive primary grain coarsening.

The reactor in which metal powder and reducing metal/metal hydride are contained at separate places can be uniformly temperature-controlled if the vapour pressure of the metal/metal hydride lies in the required range at the deoxidation temperature.

Preferably magnesium and/or magnesium hydride is used as reducing metal

Preferably an inert carrier gas flows slowly through the deoxidation reactor. The gas pressure in the reactor is preferably 50 to 500 hPa, particularly preferably 100 to 450 hPa and most particularly preferably 200 to 400 hPa.

Inert gases such as helium, neon, argon or mixtures thereof are suitable as carrier gas. Small additions of hydrogen may be advantageous. The carrier gas is preferably preheated to the reactor temperature before or during its introduction into the reactor, so that a vapour condensation of the reducing metal is avoided.

Figure 1:
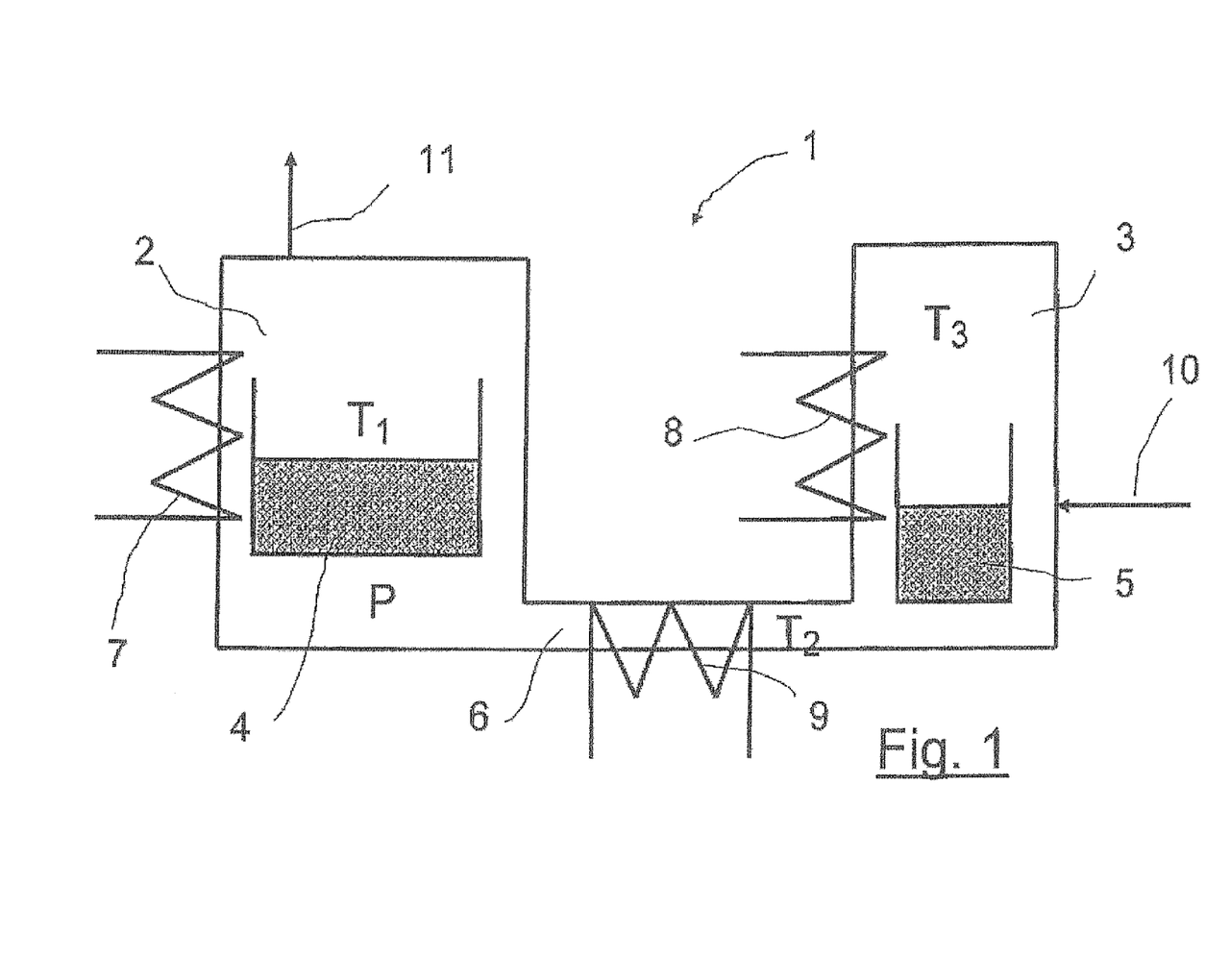
FIG. 1 shows diagrammatically a reactor that can preferably be used for carrying out the deoxidation process according to the invention.

FIG. 1 shows diagrammatically a reactor that can preferably be used for carrying out the deoxidation process according to the invention. The reactor 1 comprises two reactor spaces 2 and 3 that are joined by a connecting channel 6. The crucible 4 that contains the primary powder is placed in the reactor space 2. The reactor space 3 contains the crucible 5 with the reducing metal/metal hydride to be vaporised. Reactor spaces 2 and 3 as well as the connecting channel 6 preferably have separate heating means 7, 8 and 9 for adjusting the temperatures $T_1$, $T_2$ and $T_3$. The reducing metal/metal hydride is vaporised at the temperature $T_3$. The temperature $T_2$ in the channel 6 is chosen so that a condensation of the reducing metal/metal hydride is reliably prevented there. An inert carrier gas 10 is fed into the reactor space 3 in order to transport the reducing metal/metal hydride vapour and is withdrawn from the reactor space 2 while maintaining a pressure P.

The deoxidation process according to the invention may advantageously be employed with all metal powders. Highly sinter-active tantalum primary powders with a high specific surface of 4 to 20 m²/g, particularly preferably 6 to 15 m²/g, are, however, preferred. The process can, however, also be employed for agglomerated primary powders, i.e. primary powders heat-treated in a high vacuum.

Preferred metal primary powders furthermore have a specific grain size distribution (secondary structure) according to ASTM B 822 (Malvern MasterSizer Sµ instrument) characterised by D10 of 3 to 25 µm, D50 of 15 to 80 µm and D90 of 50 to 280 µm, in which D10, D50 and D90 denote the 10, 50 (median) and 90 weight percentiles of the grain size distribution. The grain size distribution of the primary powders remains substantially unchanged in the deoxidation. In general the specific grain size distributions according to ASTM B 822 are characterised by D10 of 3 to 50 µm, D50 of 15 to 150 µm and D90 of 50 to 400 µm.

Particularly preferred metal primary powders have been produced by a not previously published proposal of the Applicant, by reducing finely particulate oxide powders by means of vaporous reducing metals such as aluminium, magnesium, calcium, barium and/or lanthanum and/or their hydrides, in particular magnesium, under an inert carrier gas, in which the reduction is carried out at a partial vapour pressure of the reducing metal/metal hydride of 5 to 110 hPa, preferably less than 80 hPa, particularly preferably between 8 and 50 hPa, and at a carrier gas pressure of 50 to 800 hPa, preferably less than 600 hPa and particularly preferably between 100 and 500 hPa.

As tantalum pentoxide powder there is preferably used a porous, sponge-like powder with a specific particle size distribution according to ASTM B 822 (Malvern Master- Sizer Sμ instrument) of D10: 2 to 70 μm, D 50: 15 to 200 μm, and D90: 80 to 430 μm, and a specific surface (BET) according to ASTM D 3663 of 0.05 to 0.5 m²/g.

As tantalum pentoxide powder there is preferably used a porous, sponge-like powder with a specific particle size distribution according to ASTM B 822 (Malvern MasterSizer Sμ instrument) of D10: 2 to 30 μm, D 50: 15 to 175 μm, and D90: 80 to 320 μm, and a specific surface (BET) according to ASTM D 3663 of 0.05 to 0.5 m²/g.

With this preferred reduction process the reduction temperature may be reduced to 680° to 880° C. without substantially prolonging the reduction time. When using tantalum oxide or niobium oxide agglomerate powders with primary particle sizes (diameter in the case of spherical primary particles, smallest dimension in the case of non-spherical primary particles) of 0.1 to 5 μm, reduction times of between 6 and 12 hours, preferably up to 9 hours, are sufficient. Last but not least, the lower reaction temperature provides a not inconsiderable saving in energy and helps to preserve the process technology apparatus required for the reduction. Metallic primary powders with a particularly favourable secondary structure are obtained.

After the completion of the reduction a passivation of the resultant metal primary powders is effected by oxidation of the powder particle surface by controlled gradual introduction of oxygen into the reactor after cooling to a temperature below 100° C. and washing out with acids and water the oxide of the reducing metal that is formed.

In this connection tantalum powders with specific surfaces of up to 20 m²/g, preferably of 6 to 15 m²/g and particularly preferably of 8 to 14 m²/g, are obtained substantially while maintaining the particle size distribution of the initial oxide having an already outstanding mechanical stability of the particles.

The oxygen content of the tantalum primary powder after passivation is ca. 3000 μg/m², in particular 2400 μg/m² to 4500 μg/m², or from 2500 μg/m² to 3600 μg/m², or from 2600 μg/m² to 3100 μg/m², in particular less than 3000 μg/m².

The nitrogen content of the powder according to the invention is in most cases 100 ppm to 10,000 ppm, or 400 ppm to 7500 ppm, or 400 ppm to 5000 ppm, in particular 400 ppm to 3000 ppm. The oxygen and nitrogen contents are advantageously determined with a nitrogen/oxygen determinator, model TC 501-645 (Leco Instrum GmbH).

The phosphorus content of the powder according to the invention is in most cases 10 ppm to 400 ppm, or 10 ppm to 250 ppm, or 10 ppm to 200 ppm, in particular 10 ppm to 150 ppm.

The person skilled in the art knows how to specifically adjust the nitrogen or phosphorus content.

The tantalum powders obtained according to the invention with a large specific surface are suitable for the production in a manner known per se of electrolytic capacitors with specific capacities in the range from 100,000 to 350,000 μFV/g by pressing to form anode structures, sintering the anode structures at 1200° to 1250° C. to form anode bodies, and forming and attaching the counterelectrode. Unsintered anode bodies that have been obtained from the powder according to the invention have a compression strength of 1 kg to 11 kg or of 2 kg to 8 kg, or of 2 kg to 6 kg, and in particular 1 kg to 4 kg. Sintered anode bodies that have been obtained from the powder according to the invention have a compression strength of greater than 10 kg, or greater than 20 kg, or greater than 30 kg, and in particular greater than 40 kg. The compression strengths of the sintered or unsintered anodes are measured with a test instrument from the Prominent company, model "Promi 3001". To determine the compression strength of unsintered anodes, cylindrical anodes weighing 500 mg and with a diameter of 5.1 mm and a length of 4.95 mm are used, which were pressed without embedded wire at a pressing density of 5.0 g/cm³.

To determine the compression strength of sintered anodes, cylindrical anodes weighing 140 mg and with a diameter of 3.0 mm and a length of 3.96 mm are used, which were compressed with embedded wire at a pressing density of 5.0 g/cm³ and then sintered at 1210° C. for 10 minutes in a high vacuum ($10^{-4}$ mbar).

Preferred tantalum powders are extremely pure, in particular as regards the contents of impurities, which can have a negative influence on the residual current: the sum total of the contents of sodium and potassium is less than 5 ppm, preferably less than 2 ppm, and the sum total of the contents of iron, chromium and nickel is less than 25 ppm, preferably 15 ppm.

The bulk density of preferred tantalum powders is in the range from 25 to 35 g/inch³ that is favourable for processing into capacitors.

The flowability (Hall flow) of the powders is less than 150 sec/25 g or 100 sec/25 g or 50 sec/25 g, in particular is 35 sec/25 g.

Figure 5:
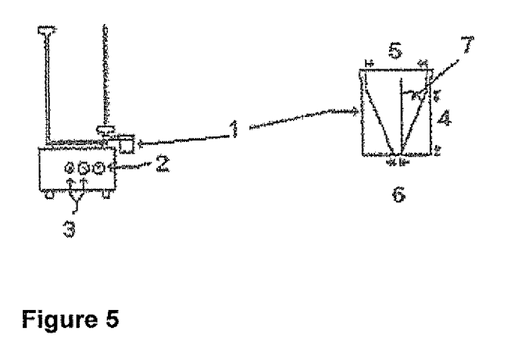
FIG. 5 illustrates an apparatus that determines the flowability.

The flowability was determined in an apparatus as illustrated in FIG. 5. This apparatus comprises a flow funnel 1 to which 25 g of the sample are added. The flow funnel has an upper opening 5 of diameter 50.5 mm, a lower opening 6 of diameter 3.8 mm, a height difference 4 of 45.6 nm, and a slope angle 7 of 30.8°. This funnel is secured to a vibrator 3 provided with a switch 2, the vibration rate of the vibrator 3 being adjustable. For the test the vibration rate was 38.5 vibrations per second.

The powders according to the invention also have an FSSS value (Fisher Sub Sieve Sizer) determined according to ASTM B 300-02 of 0.1 μm to 4 μm, or 0.5 μm to 3 μm, or 0.5 μm to 2.5 μm, in particular 0.8 μm to 2.2 μm.

The pore distributions of sintered anodes (cylindrical shape, pressing density 5.0 g/cm³, diameter 5.10 mm, length 4.95 mm, weight 500 g, sintering at 1210° C. at $10^{-4}$ mbar for 10 minutes) produced from these powders exhibit one or more maxima that lie in a size range from 0.05 μm to 10 μm, or 0.05 μm to 5 μm, or 0.05 μm to 3 μm, or 0.05 μm to 1 μm (an instrument from the Micrometrics company, "Auto Pore III" together with the measurement software "Auto Pore IV" is used to determine the pore size distribution).

In a modification of the invention the deoxidised powder according to the invention has a bulk density of 25 g/inch³ to 32 g/inch³, a specific surface of 5 m²/g to 8 m²/g as well as a specific grain size distribution (secondary structure) according to ASTM B 822 (Malvern MasterSizer Sμ instrument) characterised by D10 of 30 to 40 μm, D50 of 120 to 135 μm and D90 of 240 to 265 μm, where D10, D50 and D90 denote the 10, 50 (median) and 90 weight percentiles of the grain size distribution, and the specific capacity is 280,000 μFV/g to 340,000 μFV/g on forming at 10V or 230,000 μFV/g to 280,000 μFV/g on forming at 16V. The residual currents are 0.4 nA/μFV to 0.65 nA/μFV (10V forming voltage), and 0.4 nA/μFV to 0.5 nA/μFV (16V forming voltage).

In a further modification of the invention the deoxidised powder according to the invention has a bulk density of 25 g/inch³ to 35 g/inch³, a specific surface of 1.9 m²/g to 7.8 m²/g as well as a specific grain size distribution (secondary structure) according to ASTM B 822 (Malvern MasterSizer Sμ instrument) characterised by D10 of 14 to 20 μm, D50 of 29 to 47 μm and D90 of 51 to 87 μm, where D10, D50 and D90 denote the 10, 50 (median) and 90 weight percentiles of the grain size distribution, and the specific capacity is 125,000 μFV/g to 344,000 μFV/g or 150,000 μFV/g to 320,000 μFV/g or 180,000 μFV/g to 310,000 μFV/g on forming at 10V, or 120,000 μFV/g to 245,000 μFV/g on forming at 16V. The residual currents are 0.4 nA/μFV to 0.98 nA/μFV, or 0.4 nA/μFV to less than 0.9 nA/μFV (10V forming voltage), or 0.4 nA/μFV to 0.75 nA/μFV (16V forming voltage).

The following examples illustrate the present invention. Reference is made to the cited literature references, which thus form part of the disclosure.

EXAMPLES 1 TO 12

A) Reduction of Tantalum Pentoxide

Figure 2:
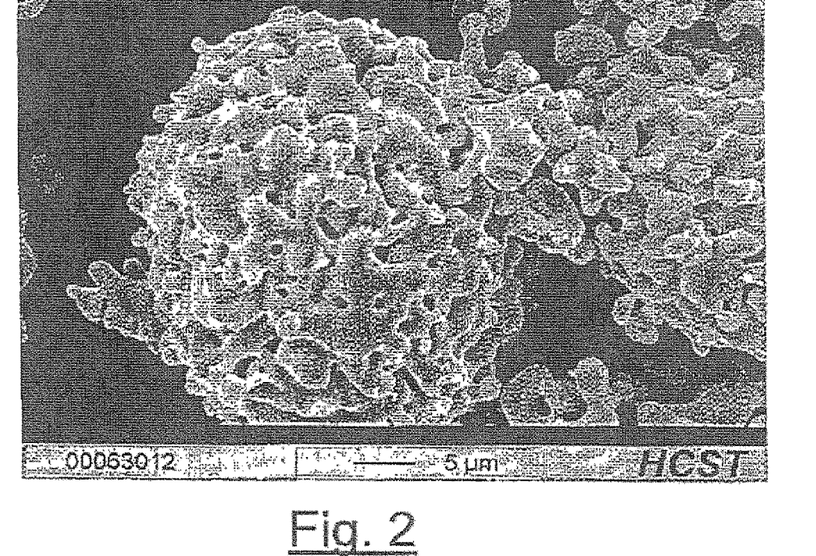
FIG. 2 shows a scanning electron micrograph of the initial pentoxide.

For the examples 1 to 9 (primary powders 1 to 9) a finely particulate, partially sintered initial tantalum pentoxide with a specific particle size distribution according to ASTM B 822 (Malvern MasterSizer St instrument) corresponding to a D10 value of 17.8 μm, to a D50 value of 34.9 μm and to a D90 value of 71.3 μm, and a specific surface (BET) according to ASTM D 3663 of 0.14 $m^2/g$, is used. The individual particles of the powder are highly porous and have a roughly spherical shape. From scanning electron micrographs it can be seen that the particles consist of highly sintered agglomerates of roughly spherical primary particles with a mean diameter of 2.4 μm (visually determined from scanning electron micrographs). FIG. 2 shows a scanning electron micrograph of the initial pentoxide.

In the Examples 10 to 12 (primary powders 10 to 12) a corresponding material of irregular shape and a particle size distribution characterised by D10=32.4 μm, D50=138.7 μm and D90=264.8 μm is used as starting material. The specific surface is 0.12 $m^2/g$. The initial tantalum pentoxide is added to a plaited tantalum wire in a reactor lined with tantalum sheeting, above a crucible that contains 1.1 times the stoichiometric amount (referred to the oxygen content of the pentoxide) of magnesium. The reactor is heated by a furnace. A gas inlet opening is arranged on the reactor, underneath the magnesium-containing crucible, and a gas removal opening is arranged above the tantalum pentoxide feed device. The internal gas pressure in the furnace can be measured via a tapping line passing through the furnace wall. Argon is used as protective gas, which flows slowly through the furnace. Before starting to heat the reactor to the reduction temperature the reactor is flushed with argon. Before the reduction temperature is reached the argon pressure is adjusted for the reduction. After completion of the reaction and cooling of the reactor, air is gradually introduced into the reactor in order to passivate the metal powder against combustion. The magnesium oxide that is formed is removed by washing with sulfuric acid and then with demineralised water until a neutral reaction is obtained. Table 1 shows the reduction conditions and properties of the primary powders of Examples 1 to 12 obtained after cooling and passivation. The "MasterSizer D10, D50, D90" values are determined according to ASTM B 822.

The oxygen content of the reduced tantalum referred to the specific surface, i.e. the quotient of oxygen content in ppm and the specific surface measured according to BET, is given in the right-hand column. A surface oxygen content of about 3000 ppm/($m^2/g$) is necessary since the tantalum powder would otherwise be pyrophoric and would burn on contact with the ambient air.

The Examples 1 to 12 were carried out at substantially constant argon pressure and constant reactor temperature. The reactor temperature defines in each case also the partial pressure of the magnesium vapour: 8 hPa at 700° C., 19 hPa at 750° C., 29 hPa at 780° C., 39 hPa at 800° C., 68 hPa at 840° C., 110 hPa at 880° C.

TABLE 1

| | Reduction Conditions | | | Product Properties of Primary Powders | | | | |
|---|---|---|---|---|---|---|---|---|
| Ex. No. | Gas Pressure hPa | Reactor Temp. ° C. | Duration h | Specific Surface $m^2/g$ | MasterSizer D10 μm | D50 μm | D90 μm | $O_2$ Content μg/$m^2$ |
| 1 | 50 | 700 | 8 | 13.4 | 14.6 | 30.5 | 52.7 | 3441 |
| 2 | 200 | 750 | 8 | 10.1 | 16.0 | 33.1 | 66.0 | 2765 |
| 3 | 350 | 750 | 8 | 12.3 | 14.9 | 31.1 | 53.4 | 3064 |
| 4 | 500 | 780 | 8 | 7.3 | 14.2 | 29.7 | 49.7 | 4063 |
| 5 | 500 | 840 | 8 | 6.3 | 12.9 | 26.9 | 43.7 | 2492 |
| 6 | 550 | 860 | 8 | 4.4 | 11.8 | 26.8 | 44.8 | 2654 |
| 7 | 580 | 880 | 8 | 4.7 | 9.3 | 26.6 | 48.4 | 2787 |
| 8 | 580 | 900 | 8 | 3.8 | 16.2 | 32.7 | 59.7 | 2872 |
| 9 | 1000 | 940 | 8 | 2.7 | 16.7 | 34.6 | 60.3 | 2798 |
| 10 | 200 | 750 | 8 | 12.8 | 33.9 | 128.3 | 244.1 | 2843 |
| 11 | 350 | 750 | 8 | 12.1 | 31.6 | 134.2 | 252.6 | 2974 |
| 12 | 500 | 780 | 8 | 8.4 | 36.8 | 137.5 | 260.1 | 2756 |

Figure 3:
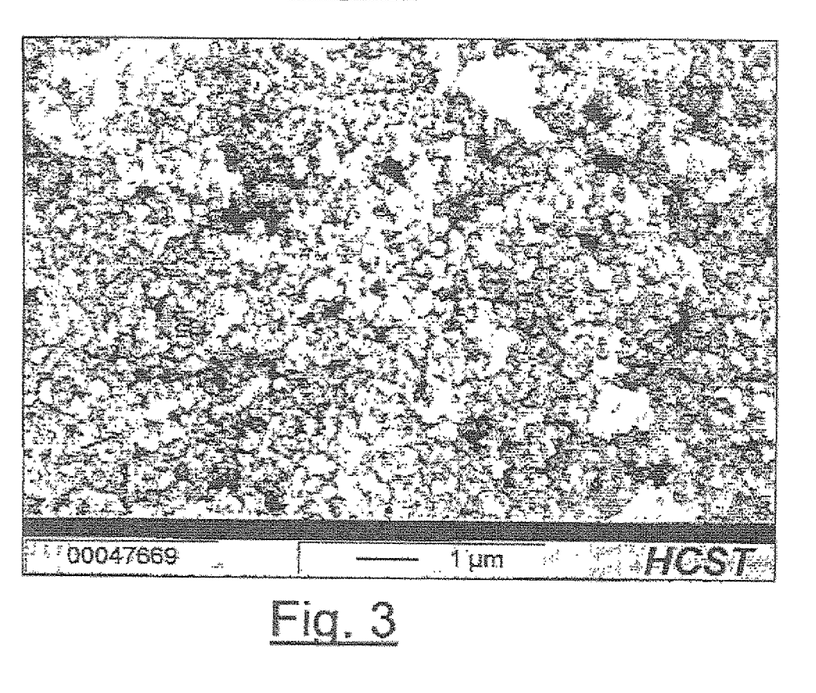
FIG. 3 shows a scanning electron micrograph of the primary powder according to Example 9.
Figure 4:
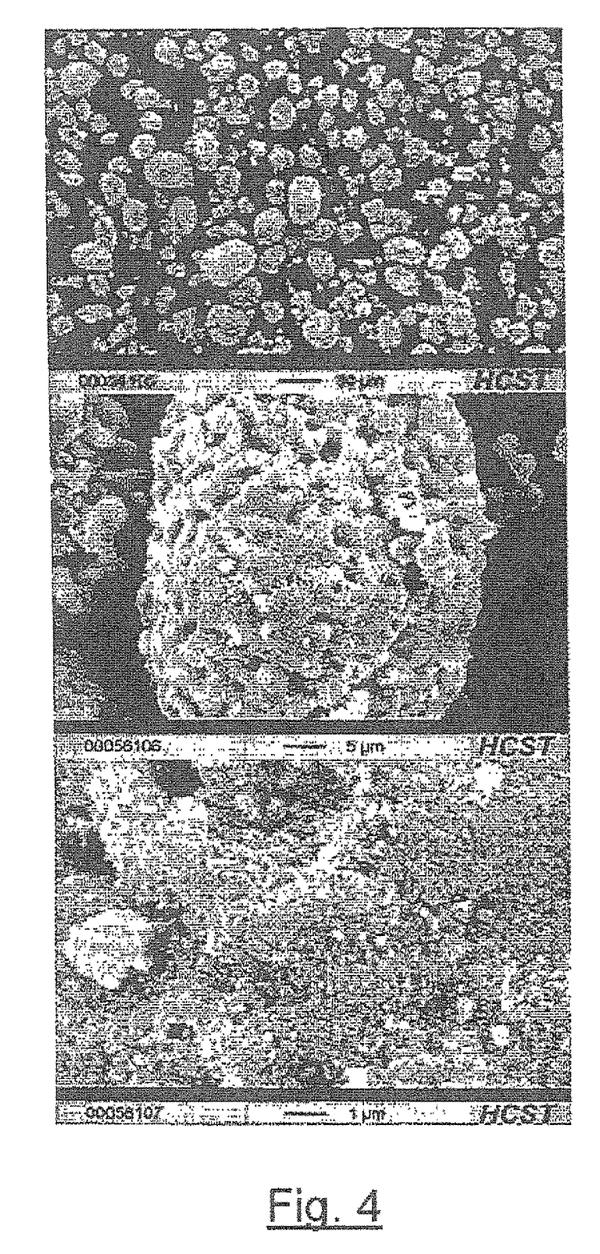
FIG. 4 shows a scanning electron micrograph of the primary powder according to Example 3.

FIG. 3 shows a scanning electron micrograph of the primary powder according to Example 9. FIG. 4 shows a scanning electron micrograph of the primary powder according to Example 3.

The grain size distribution remained approximately constant in all samples, as can be seen from the MasterSizer D10, D50 and D90 values. The specific surface, however, depended on the partial vapour pressure of the reducing metal. The oxygen content of all samples was substantially around 3000 μg/$m^2$ (ppm/($m^2/g$)) of surface, i.e. the oxygen content scarcely exceeded the necessary oxygen content and accordingly the particles did not burn on contact with the ambient atmosphere.

B) Deoxidation of the Tantalum Powders

The primary powders of Examples 1 to 12 were impregnated with ammonium hydrogen phosphate solution and dried, so as to produce a phosphorus doping of 150 ppm. The powders were then added to a crucible in a horizontal reactor tube. A crucible containing 1.2 times the stoichiometric amount of magnesium referred to the oxygen content of the powder in the reactor tube was then introduced at a certain distance from the crucible containing the powder. The crucibles can be heated by separate heating devices arranged outside the reactor tube. The reactor tube is flushed with argon protective gas by means of a gas inlet provided in front of the crucible containing the magnesium, and the argon protective gas is removed behind the crucible containing the tantalum powder. The reactor is heated in the region of the crucible containing the powder to the powder temperature given in Table 2, and the gas pressure is regulated by means of corresponding regulating valves to the gas pressure given in Table 2. The crucible containing the magnesium is then heated to the magnesium temperature specified in Table 2. The deoxidation conditions are maintained for the time duration that is likewise specified in Table 2. The reactor is then cooled and when the temperature falls below 100° C. the tantalum powder is passivated by gradual introduction of air, washed free of magnesium oxide, and screened through a sieve of 400 μm mesh width. The particle size distribution of the powders obtained (as D10, D50 and D90 values according to ASTM B 822) and the specific surface are given in Table 2.

TABLE 2

| Ex. No. | Deoxidation Conditions | | | | Powder Properties after Deoxidation | | | | |
|---|---|---|---|---|---|---|---|---|---|
| | Powder Temp. °C. | Mg Temp. °C. | Gas Pressure hPa | Duration h | MasterSizer D10 μm | D50 μm | D90 μm | Specific Surface m²/g | Bulk Density g/inch³ |
| 1 | 850 | 800 | 200 | 3 | 17.3 | 46.8 | 86.5 | 7.8 | 25.4 |
| 2 | 850 | 800 | 200 | 3 | 16.5 | 37.4 | 66.2 | 6.6 | 26.7 |
| 3 | 850 | 800 | 200 | 3 | 19.1 | 36.5 | 72.3 | 6.1 | 30.8 |
| 4 | 850 | 820 | 250 | 2.5 | 14.8 | 34.3 | 65.7 | 4.2 | 32.2 |
| 5 | 850 | 820 | 250 | 2.5 | 15.4 | 31.8 | 77.8 | 3.6 | 31.4 |
| 6a | 850 | 840 | 300 | 2 | 14.3 | 37.6 | 64.9 | 3.0 | 30.7 |
| 6b | 760 | 750 | 200 | 4 | 12.2 | 29.7 | 51.8 | 3.5 | 31.8 |
| 7a | 850 | 840 | 300 | 2 | 15.3 | 34.7 | 70.1 | 3.2 | 34.6 |
| 7b | 720 | 700 | 200 | 4.5 | 14.9 | 32.4 | 58.3 | 3.9 | 34.3 |
| 8a | 850 | 840 | 300 | 2 | 17.9 | 36.3 | 62.7 | 2.2 | 33.2 |
| 8b | 740 | 720 | 200 | 4.5 | 16.9 | 33.7 | 61.9 | 2.8 | 34.7 |
| 9 | 850 | 850 | 300 | 2 | 16.2 | 33.9 | 68.9 | 1.9 | 33.8 |
| 10 | 850 | 800 | 250 | 2 | 34.8 | 128.3 | 259.5 | 7.6 | 26.2 |
| 11 | 850 | 800 | 250 | 2 | 33.2 | 131.7 | 262.0 | 6.9 | 25.7 |
| 12 | 850 | 800 | 250 | 2 | 31.9 | 127.9 | 248.1 | 5.5 | 31.3 |

TABLE 3

| Ex. No. | Chemical Analysis ppm | | | | | | | | | | |
|---|---|---|---|---|---|---|---|---|---|---|---|
| | C | H | Mg | N | O | P | Na | K | Fe | Cr | Ni |
| 1 | 22 | 248 | 31 | 245 | 22537 | 153 | <0.5 | <0.5 | 8 | <3 | <3 |
| 2 | 23 | 256 | 28 | 221 | 19411 | 155 | <0.5 | <0.5 | 7 | <3 | <3 |
| 3 | 21 | 232 | 24 | 267 | 18557 | 151 | <0.5 | <0.5 | 2 | <3 | <3 |
| 4 | 24 | 198 | 23 | 287 | 12274 | 152 | <0.5 | <0.5 | 9 | <3 | <3 |
| 5 | 29 | 227 | 25 | 202 | 10577 | 152 | <0.5 | <0.5 | 6 | <3 | <3 |
| 6a | 23 | 242 | 28 | 289 | 6843 | 150 | <0.5 | <0.5 | 7 | <3 | <3 |
| 7a | 22 | 236 | 22 | 246 | 7702 | 154 | <0.5 | <0.5 | 8 | <3 | <3 |
| 8a | 25 | 241 | 28 | 227 | 6433 | 152 | <0.5 | <0.5 | 9 | <3 | <3 |
| 9 | 21 | 207 | 28 | 265 | 5498 | 150 | <0.5 | <0.5 | 7 | <3 | <3 |
| 10 | 23 | 215 | 27 | 258 | 22904 | 155 | <0.5 | <0.5 | 4 | <3 | <3 |
| 11 | 26 | 264 | 25 | 224 | 20344 | 157 | <0.5 | <0.5 | 8 | <3 | <3 |
| 12 | 24 | 217 | 28 | 243 | 16210 | 154 | <0.5 | <0.5 | 8 | <3 | <3 |

Pressed articles of dimensions 3 mm diameter and 3.96 mm long were produced with a pressing density of 5.0 g/cm³ from the powders; a tantalum wire 0.2 mm thick was inserted as contact wire into the press matrix before the matrix was filled with the powders. The pressed articles were sintered for 10 minutes at 1210° C. in a high vacuum.

The anode bodies were immersed in 0.1% phosphoric acid and formed at a current intensity—upper limit 150 mA—up to a forming voltage of 10V and 16V. After the current intensity had fallen the voltage was maintained for a further hour. A cathode of 18% sulfuric acid was used to measure the capacitor properties. The measurements were carried out with an alternating voltage of 120 Hz. The specific capacity and residual current are given in Table 4.

TABLE 4

| Ex. No. | Capacitor Forming Voltage 10 V | | Capacitor Forming Voltage 16 V | |
|---|---|---|---|---|
| | Specific Capacity μFV/g | Specific Residual Current nA/μFV | Specific Capacity μFV/g | Specific Residual Current nA/μFV |
| 1 | 342745 | 0.96 | — | — |
| 2 | 312563 | 0.48 | — | — |
| 3 | 294334 | 0.47 | 243988 | 0.41 |
| 4 | 226284 | 0.45 | 194374 | 0.53 |
| 5 | 198544 | 0.44 | 185592 | 0.46 |
| 6a | 151583 | 0.48 | 146745 | 0.61 |
| 6b | 182752 | 0.53 | 172991 | 0.52 |
| 7a | 171997 | 0.85 | 163237 | 0.74 |
| 7b | 207872 | 0.64 | 186473 | 0.65 |
| 8a | 137664 | 0.54 | 124538 | 0.47 |
| 8b | 148764 | 0.62 | 136421 | 0.44 |
| 9 | 125382 | 0.43 | 119231 | 0.47 |
| 10 | 338892 | 0.61 | — | — |
| 11 | 308245 | 0.56 | 241257 | 0.45 |
| 12 | 298677 | 0.48 | 238230 | 0.46 |

The invention claimed is:

1. A process for producing a deoxidized valve metal powder which comprises subjecting a valve metal powder to a deoxidation to remove residual oxygen which comprises a reducing metal and/or its hydride, wherein the deoxidation is carried out without contact between the valve metal powder to be deoxidized and a liquid reducing metal and/or metal hydride and wherein the deoxidation is carried out under an inert carrier gas at a pressure of 100 to 450 hPa and at a temperature between 690° C. to 800° C. wherein the oxygen content of the valve metal to be deoxidized is 2500 µg/m² to 3600 µg/m² and wherein the reducing metal and/or metal hydride and the valve metal powder to be deoxidized are placed at separate points in a reactor so that the reducing metal /metal hydride comes into contact with the valve metal powder only via the gaseous phase, and wherein the valve metal powder has a specific surface and the specific surface is reduced by less than a factor of 2 during deoxidation.

2. The process as claimed in claim 1, wherein said metal is aluminum, magnesium, calcium, barium and/or lanthanum and/or its hydride.

3. The process according to claim 1, wherein the deoxidation is carried out at a partial vapor pressure of the reducing metal/metal hydride of 5 to 110 hPa.

4. The process according to claim 3, wherein the vapor pressure of the reducing metal/metal hydride is less than 100 hPa.

5. The process according to claim 3, wherein the vapor pressure of the reducing metal is between 30 and 80 hPa.

6. The process according to claim 1, wherein said valve metal powder is titanium, zirconium, hafnium, vanadium, niobium, tantalum, molybdenum and/or tungsten powder.

7. The process according to claim 6, wherein said valve powder is niobium powder.

8. The process according to claim 6, wherein said valve powder is tantalum.

9. The process according to claim 1, wherein said reducing metal or said metal hydride is magnesium and/or magnesium hydride.

10. The process according to claim 1, wherein the deoxidation is carried out under an inert carrier gas at a pressure of 100 to 450 hPa.

11. The process according to claim 1, wherein the deoxidation is carried out under an inert carrier gas at a pressure of 200 to 400 hPa.

12. The process according to claim 1, which comprises reducing the metal hydride under an inert carrier gas, wherein the deoxidation is carried without contact between the valve metal powder to be deoxidized and liquid reducing metal hydride and wherein the deoxidation is carried out under an inert carrier gas at a pressure of 50 to 500 hPa and wherein the oxygen content of the valve metal to be deoxidized is 2400 µg/m² to 4500 µg/m².

13. The process according to claim 12, wherein said metal hydride is magnesium and/or magnesium hydride.

14. The process according to claim 1, wherein said valve metal powder is a tantalum powder with a specific surface of 4 to 8 m²/g, which after pressing at a pressing density of 5 g/cm³ and sintering at 1210° C. over 10 minutes has, after forming up to a forming voltage of 10V, a capacity of 220,000 to 350,000 µFV/g.

15. The process according to claim 1, wherein said valve metal powder is a tantalum powder with a specific surface of 3.5 to 6 m²/g, which after pressing at a pressing density of 5 g/cm³ and sintering at 1210° C. over 10 minutes has, after forming up to a forming voltage of 10V, a capacity of 180,000 to 250,000 µFV/g.

16. The process according to claim 1, wherein the deoxidation is carried without contact between the valve metal powder to be deoxidized and liquid reducing metal hydride and wherein the deoxidation is carried out under an inert carrier gas at a pressure of 100 to 450 hPa and a temperature from 690 to 800 ° C. wherein the oxygen content of the valve metal to be deoxidized is 2500 µg/m² to 3600 µg/m².

17. The process according to claim 1, wherein the deoxidation is carried without contact between the valve metal powder to be deoxidized and liquid reducing metal hydride and wherein the deoxidation is carried out under an inert carrier gas at a pressure of 200 to 400 hPa and a temperature from 690 to below 760 ° C. wherein the oxygen content of the valve metal to be deoxidized is 2600 µg/m² to 3100 µg/m².

18. The process according to claim 1, wherein the oxygen content of the valve metal to be deoxidized is less than 3000 µg/m².

* * * * *